Sept. 24, 1968  J. L. PARK ET AL  3,402,937
FACE-TYPE SHAFT SEAL WITH MEANS FOR OPTIMIZING FACE SEAL
LOADING AT VARIOUS SPEEDS
Filed Sept. 1, 1965
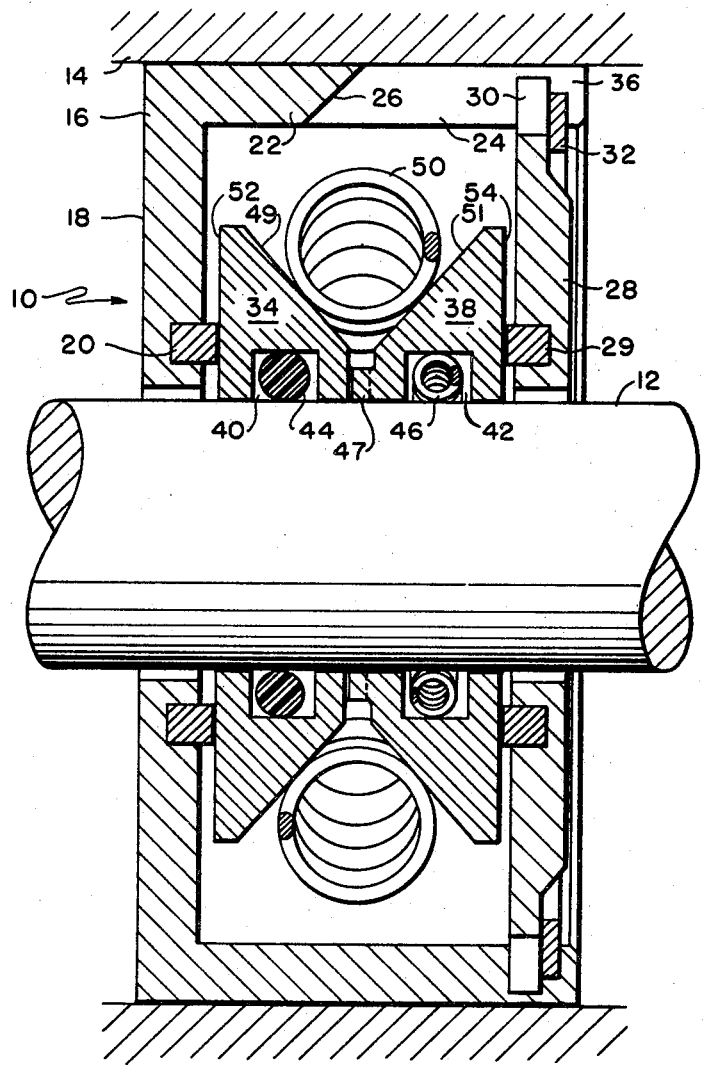
INVENTORS.
JERALD L. PARK
NORMAND L. LAGASSE
ATTORNEYS.

United States Patent Office 3,402,937
Patented Sept. 24, 1968

3,402,937
FACE-TYPE SHAFT SEAL WITH MEANS FOR OPTIMIZING FACE SEAL LOADING AT VARIOUS SPEEDS
Jerald L. Park, Stratford, and Normand L. Lagasse, Bridgeport, Conn., assignors to Avco Corporation, Stratford, Conn., a corporation of Delaware
Filed Sept. 1, 1965, Ser. No. 484,283
3 Claims. (Cl. 277—41)

ABSTRACT OF THE DISCLOSURE

A seal utilizing a split rotor is disclosed. The two sections of the split rotor are axially movable, and their seal face contact pressure is provided by the wedging action of a garter-type spring.

---

This invention relates to a self-contained dynamic face-type shaft seal in which the rotor is maintained under variable loading dependent on shaft speed.

Face-type seals are generally advantageous for use in sealing high-speed shafts. Ordinarily the face contact pressure is selected for optimum operation at a particular shaft speed; in some instances, however, the shaft speed is highly variable, and hence the face contact pressure, which is optimum at one speed, produces excessive wear at a higher speed. This invention seeks to optimize face contact pressure over the entire speed range of the shaft by utilizing a split rotor, the two sections of which are wedged apart by means of a garter-type spring. As the split rotor and the garter spring rotate with the shaft, the centrifugal action on the garter spring tends to enlarge it, thereby decreasing the wedging action against the two parts of the rotor. This action results in a decrease on the face contact pressure as the speed of the shaft increases, and excessive wear is thus avoided at higher shaft speeds.

This novel type seal is self-contained, and may be constructed in an envelope having dimensions no greater than a conventional lip-type seal. The seal is so constructed that a continuous flow of lubricating and cooling oil is circulated by its rotor elements.

It is an object of this invention to provide a completely self-contained face-type seal having optimized face loading of the seal material throughout a wide speed range.

Another object of this invention is to provide a face-type seal in which the face loading decreases at a controlled rate with increasing speed.

Another object of this invention is to provide a garter-type spring for maintaining a controlled face loading on the sealing elements of a face-type seal, the tension of said spring being a function of shaft speed.

Still another object of this invention is to provide a face-type, self-lubricating, self-contained seal having a split rotor carrying the face seal elements, the face contact seal pressures being maintained by a garter-type spring wedged between the split rotor sections, one of said sections carrying an inner seal, the other carrying a clutching mechanism.

For further objects and advantages of this invention reference should now be made to the following detailed specification and to the accompanying drawing in which the single figure represents a preferred embodiment of this invention.

The numeral 10 generally indicates the novel face-type seal for sealing the flow of oil between a shaft 12 and apparatus housing 14. The apparatus housing 14 may be the enclosure for equipment such as a motor, transmission, or pump, or other similar rotating equipment, and it contains the oil which must be sealed.

All the components of the seal 10 are self-contained within an annular metal casing 16 having an end wall 18 on which an annular end face sealing element 20 is secured. The opposite end of the metal casing 16 is generally open to the lubricant of the apparatus housing 14 being sealed. The annular outer wall 22 of casing 16 is provided with a plurality of axially extending, radial slots 24 which terminate in a beveled portion 26. The slots 24 perform two functions. First, the slots provide an anti-rotation device for a circular thrust plate 28 which carries a face seal element 29. That is to say, the thrust plate 28 is provided with a plurality of radial projections 30 which extend into the slots 24 when the plate 28 is positioned within the casing 16. As shown, the thrust plate 28 is retained in place by a snap ring 32 positioned in an appropriate circular recess 36 adjacent the open end of the wall 22. In mass production the thrust plate 28 would be retained without the snap ring by simply peening over the open end of the peripheral wall 22. The second function of the slots 24 is to provide a path for the continuous flow of lubricant from the housing 14 through the casing 16.

The rotor of the seal 10, inserted into the casing prior to the assembly of the thrust plate 28 and snap ring 32, comprises two identical annular sections 34 and 38. The inner periphery of the sections are each provided with annular O-ring type grooves 40 and 42, respectively. An O-ring 44 positioned in the groove 40 provides a static seal between the shaft 12 and the rotor section 34. A garter-type spring 46 positioned in the groove 42 between the shaft 12 and the section 38 provides a sprag-type one-way clutch for drivingly connecting the shaft to the rotor sections. Each of the identical rotor sections 34 and 38 is provided with axially matching tabs or face splines 47 so that the sections are rotated together by the shaft through the sprag-type drive spring 46.

Each of the rotor sections 34 and 38 have beveled segments 49 and 51 which, when positioned within the housing in complementary face-to-face relationship, provide a V-shaped groove into which a garter spring 50 is wedged in tension. The garter spring 50 exerts a force against the beveled segments 49 and 51 of the sections 34 and 38 tending to drive the sections 34 and 38 apart. This serves to force the face 52 of the segment 34 against the face seal element 20 and to drive the face 54 of the section 38 against the face seal element 29.

In operation, as the shaft 12 is rotated, a driving connection is established between the shaft 12 and the rotor section 38 through the sprag-type spring drive 46, and to the rotor section 34 through the rotor tabs or splines 47. Oil from within the housing 14 passes through the thrust plate elements into the casing 16, but is prevented from passing through the housing by means of the static seal 44 between the rotor section 34 and the shaft 12, and by means of the seal between the rotor face 52 and the sealing element 20. At zero speed the garter-type spring exerts a given amount of pressure on the beveled faces on the rotor sections 34 and 38, thereby establishing a given face contact pressure between the elements 20 and 52 and 29 and 54. As the speed of the shaft increases, the centrifugal action on the garter spring 50 tends to increase the diameter of the garter spring 50, thereby reducing the pressure exerted on the beveled faces. The greater the speed, the greater the diameter of the garter spring 50, and hence less face contact pressure is exerted on the sealing elements. This feature results in reduced wear on the sealing elements.

As the rotor sections 34 and 38 are rotated by the shaft 12, the oil within the casing 16 is rotated outwardly by the centrifugal action of the rotor segments, and it passes through the slots 24 and back into the oil reservoir within the housing 14. Hence, oil is continuously circulated from the oil reservoir in housing 14 throughout the casing 16 and out through the slots 24 back to the housing 14. This circulation feature provides additional cooling for the seal elements and eliminates the breaking down of oil within the seal to further increase the life of the sealing elements. The beveled portion 26 of the slot 24 provides an enlarged slot without materially decreasing the structural rigidity of the annular casing 16 so as to permit maximum oil flow.

Thus, by means of this invention there has been provided a seal having a very small axial dimension equivalent to and interchangeable with a conventional lip seal, a seal which is completely self-contained requiring no shimming or locking at installation to achieve controlled loading or driving, and a seal in which optimum face loading of the sealing elements is achieved throughout a wide range of speeds. Furthermore, this seal lends itself readily to pressure balancing. That is, where pressure balancing is accomplished by providing a step on the shaft 12, one of the sections 34 of the rotor would ride one step, while the section 38 would ride on the other step. In addition, the surfaces 49 and 51 of the rotor sections may be disposed at different angles and permit different face loadings on the seal and thrust plate surfaces, as may be required for specific applications.

Since various modifications and adaptations of this invention will be apparent to those skilled in the art, it is our intention that this invention be limited only by the appended claims as read in the light of the prior art.

What is claimed is:

1. A self-contained dynamic face-type seal for providing a fluid seal between an annular opening in a housing and a rotating shaft extending therethrough, the combination comprising:

an annular seal casing carried in said opening in sealing relationship to said housing, said casing carrying a seal ring and a thrust ring;

an annular rotor mounted in said casing between said seal ring and said thrust ring and concentrically therewith, said rotor having an annular surface in contact with said seal ring and an annular surface in contact with said thrust ring, said rotor being comprised of two separate annular sections, means for drivingly engaging one of said sections with said shaft, means on said sections for angularly fixing said sections with respect to one another and permitting axial displacement of said sections, each of said sections having a juxtaposed beveled annular portion, which together form a V-shaped groove in said rotor;

and a garter spring mounted in tension in said groove for axially displacing said separate sections as a function of the velocity of said rotor.

2. The invention as defined in claim 1 wherein said casing is provided with a plurality of elongated axial slots for providing a continuous path for the flow of oil from said casing to said housing.

3. The invention as defined in claim 1 wherein said two sections are identical, each having an inner peripheral groove, and a static O-ring in the groove of one of said sections for creating a static seal between said shaft and said one rotor section, said means for drivingly engaging one of said sections with said shaft comprising a sprag-type spring clutch in the groove of said other section for providing a driving connection between said shaft and said other section of said rotor.

References Cited

UNITED STATES PATENTS

| | | | |
|---|---|---|---|
| 1,975,170 | 10/1934 | Olson | 277—70 X |
| 2,714,025 | 7/1955 | Heinrich | 277—84 |
| 2,756,080 | 7/1956 | Andersen et al. | 277—40 |
| 3,194,342 | 7/1965 | Heim | 277—1 X |
| 3,275,334 | 9/1966 | Voitik | 277—41 |

FOREIGN PATENTS

| | | |
|---|---|---|
| 905,084 | 2/1954 | Germany. |

SAMUEL ROTHBERG, *Primary Examiner.*